US007100586B2

(12) United States Patent
Matsumoto

(10) Patent No.: US 7,100,586 B2
(45) Date of Patent: Sep. 5, 2006

(54) FAILURE DIAGNOSIS SYSTEM FOR EXHAUST GAS RECIRCULATION DEVICE

(75) Inventor: Takuya Matsumoto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/075,894

(22) Filed: Mar. 10, 2005

(65) Prior Publication Data

US 2005/0199050 A1   Sep. 15, 2005

(30) Foreign Application Priority Data

Mar. 12, 2004   (JP)   .............................. 2004-071311

(51) Int. Cl.
  F02M 25/07    (2006.01)
  G01M 15/05    (2006.01)
  G06F 19/00    (2006.01)

(52) U.S. Cl. ................................ 123/568.16; 73/118.1; 701/108

(58) Field of Classification Search ........... 123/568.11, 123/568.16, 568.21; 701/108; 73/117.3, 73/118.1, 118.2; 702/45, 47
See application file for complete search history.

(56) References Cited

U.S. PATENT DOCUMENTS 4,825,841 A  *  5/1989  Norota et al. ............... 701/108
4,870,942 A  * 10/1989  Shibata et al. .............. 701/108
5,653,212 A  *  8/1997  Hotta et al. ............ 123/568.16
5,675,080 A  * 10/1997  Wada ........................ 73/118.1
6,609,059 B1 *  8/2003  Kawaguchi et al. .... 123/568.16
6,708,676 B1 *  3/2004  Akao et al. ............ 123/568.16
6,837,226 B1 *  1/2005  Wang et al. ........... 123/568.16
6,876,933 B1 *  4/2005  Yasui et al. ............ 123/568.16

FOREIGN PATENT DOCUMENTS

JP      A 05001624      1/1993
JP      A 07004320      1/1995

* cited by examiner

Primary Examiner—Willis R. Wolfe, Jr.
(74) Attorney, Agent, or Firm—Kenyon & Kenyon LLP

(57) ABSTRACT

An engine ECU of a failure diagnosis system for an EGR device starts the EGR device by opening an EGR valve upon establishment of monitor conditions, detects an actual intake pipe pressure PMON based on a value of a vacuum sensor upon elapse of a predetermine time, calculates an estimated intake pipe pressure PMON using a physical model, cuts the EGR operation by changing the opened state to the closed state of the EGR valve, detects an actual PMOFF based on an input value of the vacuum sensor upon elapse of a predetermined time from cut of EGR, calculates an estimated PMOFF using the physical model, and determines the operation of the EGR device as being normal when a result of comparing a difference between the estimated PMON and estimated PMOFF with a difference between the actual PMON and actual PMOFF is smaller than a predetermined value.

4 Claims, 6 Drawing Sheets

FAILURE DIAGNOSIS SYSTEM FOR EXHAUST GAS RECIRCULATION DEVICE

INCORPORATION BY REFERENCE

The disclosure of Japanese Patent Application No. 2004-71311 filed on Mar. 12, 2004, including the specification, drawings and abstract are incorporated herein by reference in its entirety.

BACKGROUND OF THE INVENTION

1. Field of Invention

The invention relates to an exhaust gas recirculation device that partially recirculates exhaust gas discharged from an internal combustion engine into an intake pipe thereof, and particularly, to a failure diagnosis system for diagnosing a failure in the exhaust gas recirculation device.

2. Description of Related Art

An exhaust gas recirculation (hereinafter referred to "EGR") device for partially recirculating the exhaust gas discharged from the internal combustion engine into an intake pipe thereof has been widely employed in the internal combustion engine for a vehicle so as to reduce nitrogen oxides ($NO_x$) contained in the exhaust gas and to improve fuel efficiency. When failure in the operation of the EGR device is caused by abnormality in an operation of an EGR valve or an EGR pipe, the amount of generated $NO_x$ is likely to be increased. The failure in the EGR device, however, hardly influences the performance of the EGR device itself. This may keep the vehicle operator from becoming aware of the abnormality in the EGR device. Accordingly a large amount of $NO_x$ may be discharged to atmosphere, leading to air pollution.

The technology for detecting the failure in the EGR device as aforementioned has been proposed in publications, for example, JP-A-5-1624 or JP-A-7-4320 so as to solve the aforementioned problem.

JP-A-5-1624 discloses a failure diagnosis system for an exhaust gas recirculation control device in which the accuracy for detecting abnormality in the EGR device is improved upon its ON/OFF operations. The failure diagnosis system for the exhaust gas recirculation control device is provided with a recirculation pipe that recirculates the exhaust gas discharged from the internal combustion engine into an intake pipe, a recirculation valve that controls a flow rate of the exhaust gas flowing through the recirculation pipe, a recirculation valve passage area control unit that controls a passage area of the recirculation valve, an operation condition detection unit that detects an operation condition of the internal combustion engine, a memory unit that stores a first detection value detected by the operation condition detection unit when the passage area of the recirculation valve which is brought into a first state where the passage area is relatively large by the recirculation valve passage area control unit, a memory unit that stores a second detection value detected by the operation condition detection unit when the passage area of the recirculation valve which is brought into a second state where the passage area is relatively narrow or zero by the recirculation valve passage area control unit, and a determination unit for diagnosing the failure based on at least the first and the second detection values. The determination unit serves to diagnose the failure in a predetermined area except a high load area where the detection value detected by the operation condition detection unit indicates larger loss in the recirculation pipe, and a low load area where the flow rate of the exhaust gas flowing through the recirculation pipe is small.

In the failure diagnosis system for the exhaust gas recirculation control device, upon detection of the abnormality in the EGR device by tuning ON/OFF thereof, the failure determination area is limited depending on the load. This makes it possible to detect the failure in ON state of the EGR device and in an area where the detection value such as the difference in the intake manifold pressures between ON state and OFF state of the EGR device is large. The failure is detected only when the flow rate of the exhaust gas recirculated by the EGR device is equal to or lower than a predetermined value. Accordingly, fluctuation in the torque upon ON/OFF operations of the EGR device may be reduced.

JP-A-7-4320 discloses an exhaust gas recirculation control device capable of accurately diagnosing abnormality in an exhaust gas recirculation device. The exhaust gas recirculation control device is provided with a recirculation pipe that recirculates the exhaust gas discharged from the internal combustion engine into an intake pipe, a recirculation pipe operation device that opens or closes the recirculation pipe, an intake air condition unit that detects a condition of air flowing through the intake pipe, a first control unit that controls an opening degree of the recirculation pipe operation device between a first value and a second value that is smaller than the first value, a first change amount detection unit that detects a change amount of the condition of air flowing through the intake pipe when the recirculation pipe operation device is operated by the first control unit, a first determination unit that determines whether a detection result of the first change amount detection unit is smaller than a predetermined amount, a second control unit that changes the opening degree of the recirculation pipe operation device by the difference in the opening degree larger than the one that has been changed by the first control unit when it is determined that the change amount detected by the first change amount detection unit is smaller than the predetermined amount, a second change amount detection unit that detects a change amount of the condition of air flowing through the intake pipe when the operation of the recirculation pipe operation device is changed by the second control unit, and a second determination unit that determines the exhaust gas recirculation device as being abnormality when a detection result of the second change amount detection unit is smaller than the predetermined value.

In the exhaust gas recirculation control device, when the EGR device is in a normal operation state, the operation state of the EGR device is generally detected as being normal by the first determination unit. In the case where the EGR rate obtained during detection of abnormality in the EGR device is small, the operation state may be detected as being abnormal by the first determination unit contrary to the fact that the actual operation state is normal. In the aforementioned case, the EGR rate is increased, and then the determination is made with respect to abnormality in the operation state by the second determination unit. The operation state at this stage may at least be determined as being normal. This makes it possible to prevent the false determination with respect to the operation state from being made as abnormal contrary to the actual normal operation state. When the operation state of the EGR device is abnormal, it may be determined as being abnormal with certainty by the second determination unit. In the aforementioned exhaust gas recirculation control device, the determination with respect to the abnormality in the EGR device will be made again at the increased EGR rate only when the first determination unit does not determine the EGR device as being in the normal operation state. Accordingly this makes it possible to prevent increase in the exhaust gas caused by unnecessarily increasing the EGR rate.

In the failure diagnosis system for an EGR control device disclosed in JP-A-5-1624 or the EGR control device disclosed in JP-A-7-4320, when the EGR device is normally operated, the exhaust gas is recirculated into the intake manifold. Accordingly the pressure change or change in the flow rate at the intake manifold is detected upon ON/OFF operations of the EGR device, based on which the abnormality diagnosis with respect to the abnormality in the EGR device may be performed.

The change in the pressure of the flow rate may be influenced not only by the operation state of the EGR device but also other factors, for example, the engine speed, the opening degree of the throttle valve and the like. Under the influence of the aforementioned factors, the failure in the EGR device cannot be accurately diagnosed.

SUMMARY OF THE INVENTION

It is an object of the invention to provide a failure diagnosis system that allows an accurate failure diagnosis with respect to the exhaust gas recirculation device.

A failure diagnosis system for an exhaust gas recirculation device provided in an internal combustion engine for recirculating a part of an exhaust gas into an intake pipe of the internal combustion engine via a circulation valve includes a detection unit that detects actual conditions of air flowing through the intake pipe of the internal combustion engine in an on state of the exhaust gas recirculation unit where the exhaust gas is recirculated, and in an off state of the exhaust gas recirculation unit where the exhaust gas is not recirculated, respectively, a calculation unit that calculates estimated conditions of the air flowing through the intake pipe in the on state of the exhaust gas recirculation unit, and in the off state of the exhaust gas recirculation unit, respectively upon detection of the actual conditions by the detection unit, and a diagnosis unit that diagnoses a failure in the exhaust gas recirculation device based on the actual conditions of air detected by the detection unit and the estimated conditions of air calculated by the calculation unit.

According to the aforementioned failure diagnosis system, actual conditions (pressure, flow rate) of air flowing through the intake pipe of the internal combustion engine are detected by the detection unit while operating and stopping the exhaust gas recirculation device. The calculation unit calculates estimated conditions (pressure, flow rate) of air flowing through the intake pipe of the internal combustion engine while operating and stopping the exhaust gas recirculation device. The diagnosis unit obtains a difference in the detected actual air conditions between ON state and OFF state of the exhaust gas recirculation device, and further obtains a difference in the estimated air conditions between ON state and OFF state of the exhaust gas recirculation device. When the exhaust gas recirculation device is normally operated, the difference values of the actual air condition and the estimated air condition are substantially the same. Meanwhile when the exhaust gas recirculation device is not normally operated owing to abnormality therein, the difference value of the actual air condition is expected to be smaller than that of the estimated air condition. Assuming that there is a failure in the exhaust gas recirculation device, the exhaust gas cannot sufficiently recirculated into the intake pipe. Even in the aforementioned state, the estimated pressure is calculated as the value indicating the pressure increase contrary to the fact that the actual intake pipe pressure detected by the detection unit has not increased. This is because the estimated condition is calculated using a formula based on a physical model on the assumption that the exhaust gas recirculation device is normally operated. According to the embodiment of the invention, the failure in the exhaust gas recirculation device can be accurately diagnosed.

In the failure diagnosis system, the detection unit is provided in the intake pipe of the internal combustion engine, and includes an actual intake pipe pressure detection unit that detects an actual pressure within the intake pipe. The calculation unit includes an intake pipe pressure estimation unit that calculates an estimated intake pipe pressure. The diagnosis unit includes a failure diagnosis unit that diagnoses a failure in the exhaust gas recirculation device based on the estimated intake pipe pressures calculated in the on state and the off state of the exhaust gas recirculation unit, and the actual intake pipe pressures detected in the on state and the off state of the exhaust gas recirculation unit.

According to the aforementioned failure diagnosis system, each value of the intake air pressures of the internal combustion engine is detected by the detection unit in ON and OFF states of the exhaust gas recirculation device, respectively. The calculation unit calculates each value of the estimated pressures of air flowing through the intake pipe of the internal combustion engine in ON and OFF states of the exhaust gas recirculation device. The diagnosis unit obtains a difference value of the actual pressures of air between ON and OFF states of the exhaust gas recirculation device, and further obtains a difference value of the estimated pressures of air between ON and OFF states of the exhaust gas recirculation device. When the exhaust gas recirculation device is normally operated, the difference values of the actual pressure and the estimated pressure are substantially the same. Meanwhile when the exhaust gas recirculation device is not normally operated owing to abnormality therein, the difference value of the actual pressure is expected to be smaller than that of the estimated pressure. Assuming that there is a failure in the exhaust gas recirculation device, the exhaust gas cannot be sufficiently recirculated into the intake pipe. Even in the aforementioned state, the estimated pressure is calculated as the value indicating the pressure increase contrary to the fact that the actual intake pipe pressure detected by the detection unit has not increased. According to the embodiment of the invention, the failure in the exhaust gas recirculation device can be accurately diagnosed.

In the failure diagnosis system, the diagnosis unit includes a failure diagnosis unit that diagnoses a failure in the exhaust gas recirculation device by comparing a difference between the estimated intake pipe pressure in the on state of the exhaust gas recirculation device and the estimated intake pipe pressure in the off state of the exhaust gas recirculation device with a difference between the actual intake pipe pressure in the on state of the exhaust gas recirculation device and the actual intake pipe pressure in the off state of the exhaust gas recirculation device.

According to the aforementioned failure diagnosis system, the diagnosis unit compares the difference in the estimated intake pipe pressure in ON (estimated PMON value) and OFF (estimated PMOFF value) states of the exhaust gas recirculation device (estimated PMON value—estimated PMOFF value) with the difference in the actual intake pipe pressure in ON (actual PMON value) and OFF (actual PMOFF value) states of the exhaust gas recirculation device (actual PMON value—actual PMOFF value).

Assuming that there is an error in the intake pipe pressure value detected by the detection unit, for example, a pressure sensor, both actual pressure values in ON and OFF states of the exhaust gas recirculation device may have the same errors. Accordingly the difference between those values may be offset. According to the embodiment of the invention, the failure in the exhaust gas recirculation device may be accurately diagnosed.

In the failure diagnosis system, the diagnosis unit includes a failure diagnosis unit that diagnoses a failure in the exhaust gas recirculation device by comparing a difference between the estimated intake pipe pressure and the actual intake pipe pressure both in the on state of the exhaust gas recirculation device with a difference between the estimated intake pipe pressure and the actual intake pipe pressure both in the off state of the exhaust gas recirculation device.

According to the aforementioned failure diagnosis system, the diagnosis unit compares the difference between the estimated intake pipe pressure (estimated PMON value) and the actual intake pipe pressure (actual PMON value) in ON state of the exhaust gas recirculation device (estimated PMON value−actual PMON value) with the difference between the estimated intake pipe pressure (estimated PMOFF value) and the actual intake pipe pressure (actual PMOFF value) in OFF state of the exhaust gas recirculation device (estimated PMOFF value−actual PMOFF value). The aforementioned comparison may offset the error as mentioned above. Accordingly, the failure in the exhaust gas recirculation device may be accurately diagnosed by the failure diagnosis system according to the invention.

In the failure diagnosis system, the calculation units includes an estimated intake pipe pressure calculation unit that calculates the estimated intake pipe pressure based on at least one of a rotating speed of the internal combustion engine, an opening degree of a throttle valve, and a flow rate of intake air.

According to the aforementioned failure diagnosis system, the pressure within the intake air may be calculated in consideration with the change in the engine speed, the opening degree of the throttle valve, and the intake air flow rate of the internal combustion engine. The failure in the exhaust gas recirculation device may be accurately diagnosed irrespective of the operation state of the internal combustion engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
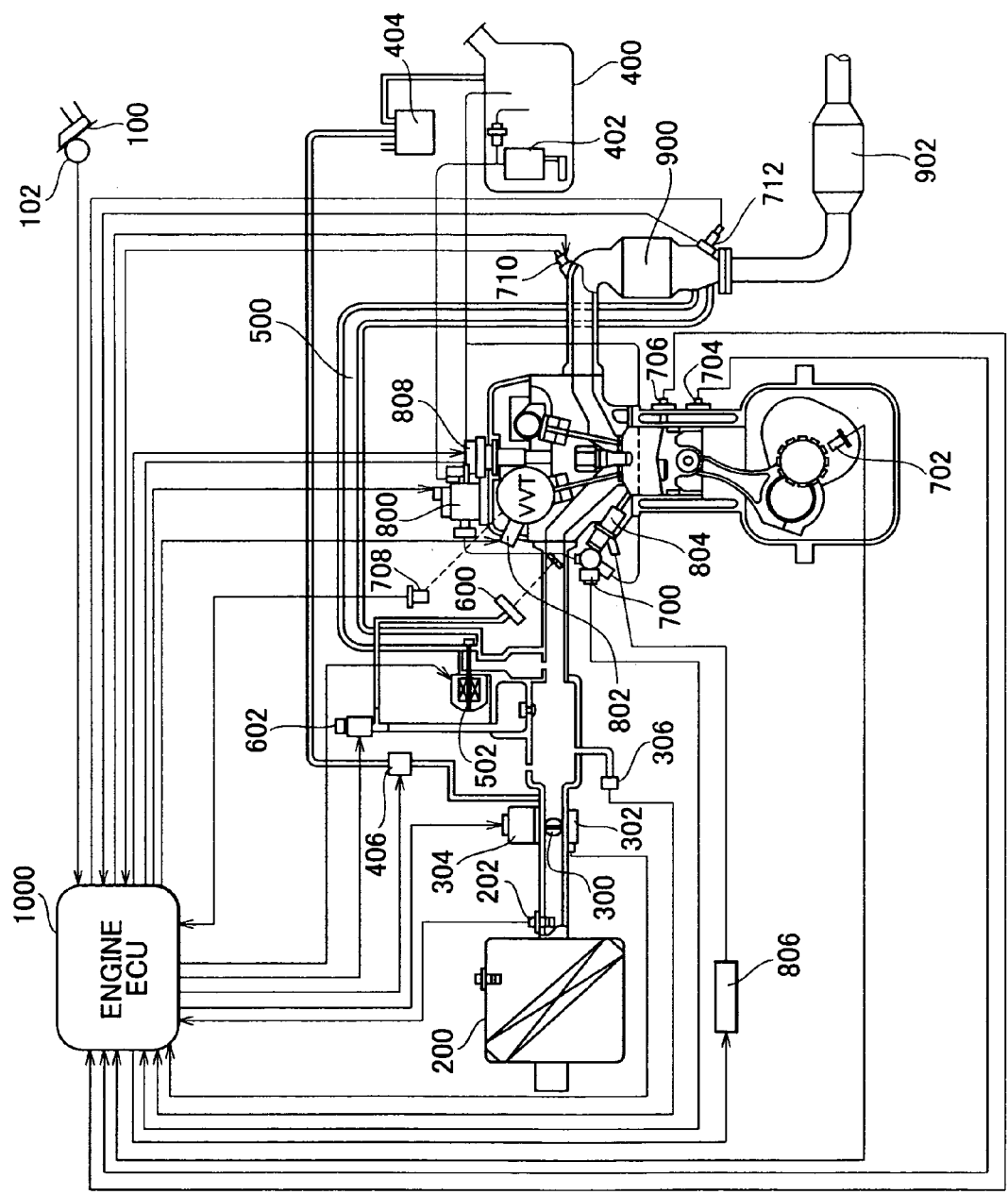
FIG. 1 is a view representing an engine system of a vehicle to which an EGR failure diagnosis system according to an embodiment of the invention is applied.

An embodiment of the invention will be described referring to the drawings. The same elements will be designated with the same reference numerals, and accordingly, descriptions and functions of those respective elements are identical. The detailed explanation of those elements, thus, will not be described repeatedly.

Referring to FIG. 1, an engine system of a vehicle including an engine ECU (Electric Control Unit) that realizes an EGR failure diagnosis system according to the embodiment will be explained.

Referring to FIG. 1, in the engine system, air is introduced into a combustion chamber of the engine through an air cleaner 200. During introduction of air, a flow rate of the intake air is detected by an air flow meter 202, and a signal indicating the intake air flow rate is input to an engine ECU 1000. The intake air flow rate is changed by adjusting an opening degree of a throttle valve 300. The opening degree of the throttle valve 300 is changed by a throttle motor 304 operated in accordance with a signal from the engine ECU 1000. The opening degree of the throttle valve 300 is detected by a throttle position sensor 302, and a signal indicating the opening degree of the throttle valve 300 is input to the engine ECU 1000.

The fuel stored in a fuel tank 400 is injected by a fuel pump 402 into the combustion chamber from a high pressure fuel injector 804 via a high pressure fuel pump 800. Mixture of air introduced from the intake manifold and the fuel injected into the combustion chamber from the high pressure fuel injector 804 is ignited and burned with an ignition coil 808 combined with an igniter to which a control signal is input from the engine ECU 1000.

The exhaust gas generated by burning the air/fuel mixture is discharged into atmosphere through the exhaust manifold, and three-way catalytic converters 900, 902, respectively.

As shown in FIG. 1, the engine system is provided with an EGR device in which the flow rate of the exhaust gas flowing from the downstream side of the three-way catalytic converter 900 to an EGR pipe 500 is controlled by an EGR valve 502. The EGR device or the exhaust gas recirculation device serves to recirculate a part of the exhaust gas discharged from the engine into the intake system so as to be mixed with new air/fuel mixture. As a result, the combustion temperature is reduced to restrain generation of nitrogen oxides ($NO_x$) and to improve the fuel efficiency by restraining the pumping loss.

Figure 2:
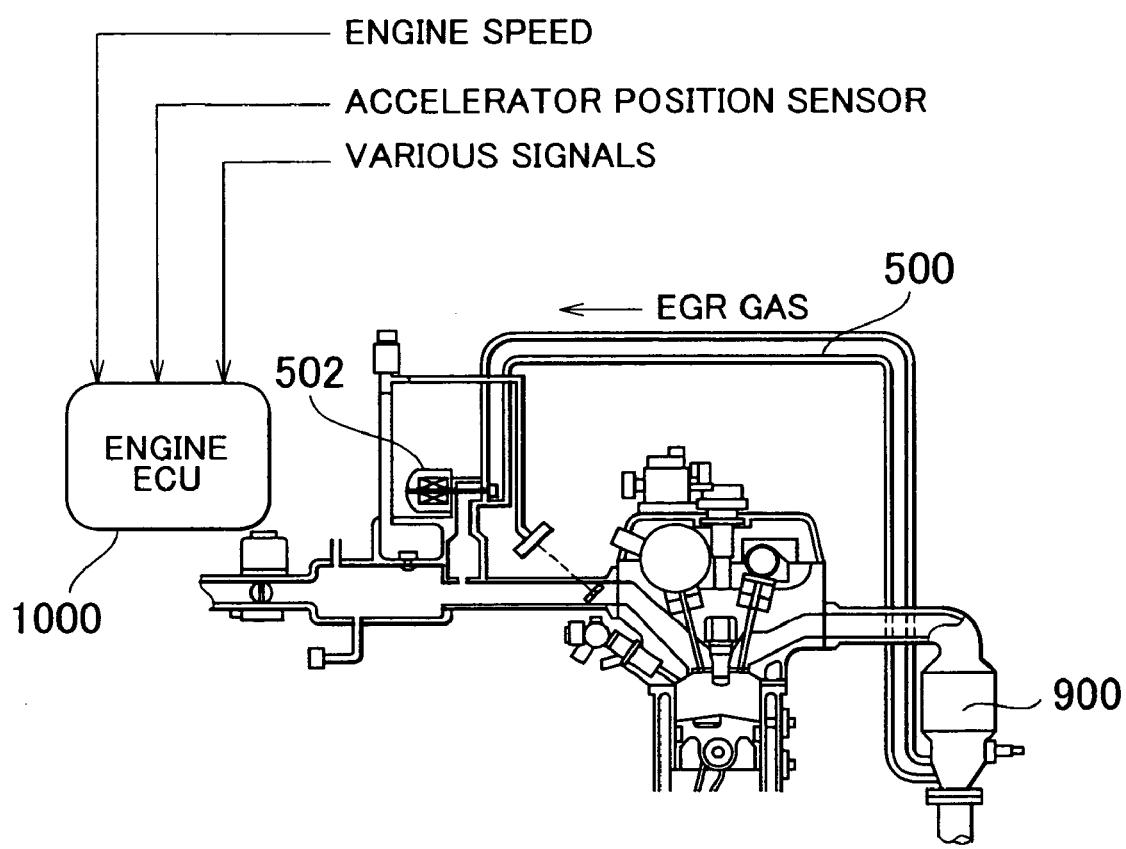
FIG. 2 is an enlarged view of an EGR device.
Figure 3:
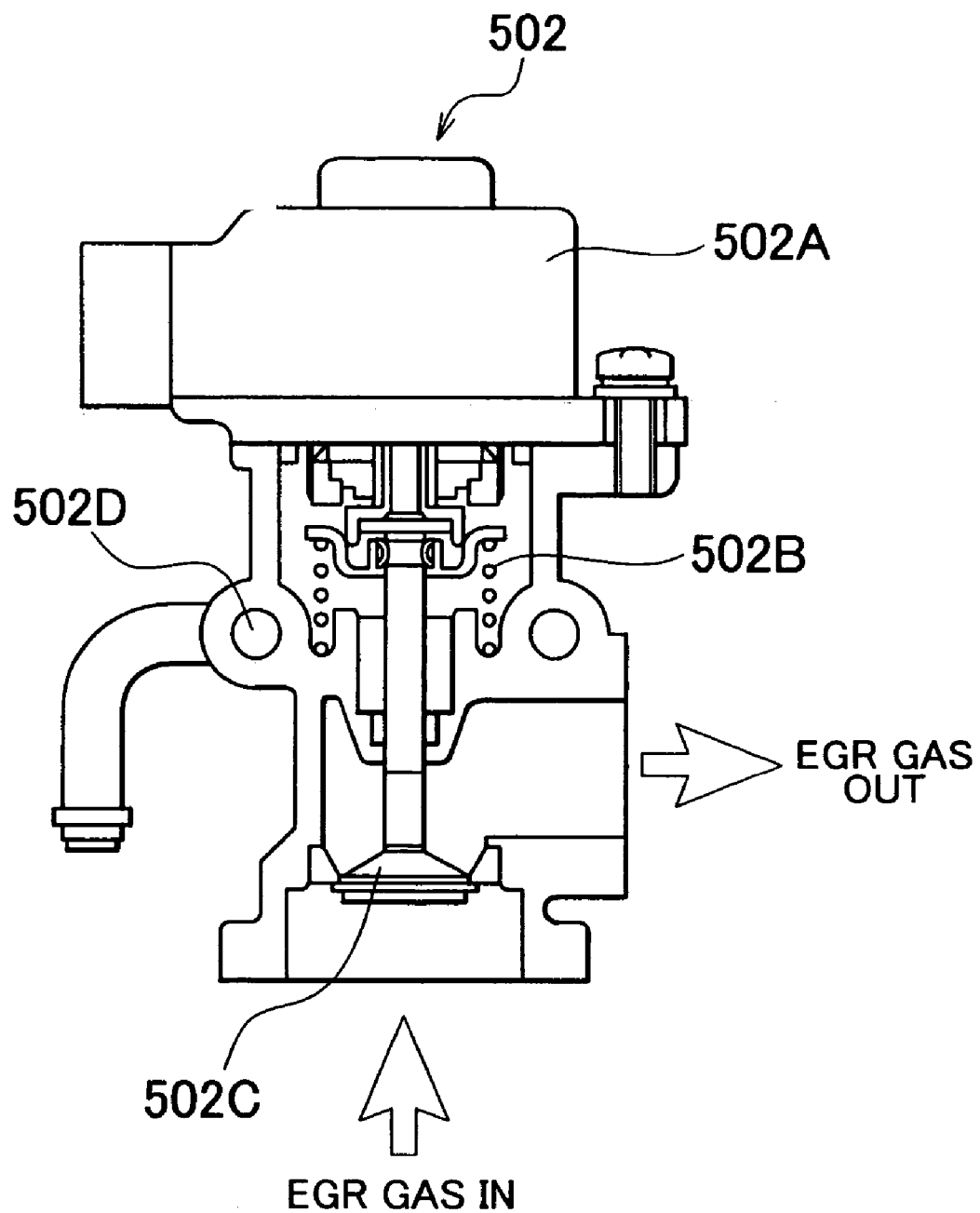
FIG. 3 is an enlarged view of an EGR valve.

FIG. 2 is a partially enlarged view of the EGR device shown in FIG. 1. FIG. 3 is a partially enlarged view of the EGR valve 502 of the EGR device.

Referring to FIGS. 2 and 3, the EGR gas, that is, the exhaust gas passing through the three-way catalytic converter 900 flows through the EGR pipe 500 so as to be introduced into the EGR valve 502. The EGR valve 502 is subjected to a duty control executed by the engine ECU 1000 which controls an opening degree of the EGR valve 502 based on various signals indicating, for example, an engine speed, a signal from an accelerator position sensor 102, and the like.

Referring to FIG. 3, the EGR valve 502 includes a stepping motor 502A activated upon receipt of a control signal from the engine ECU 1000, a poppet valve 502C having its opening degree linearly controlled by the stepping motor 502A, and a return spring 502B. As the high temperature EGR gas recirculated into the combustion chamber may give an adverse influence on performance or durability of the EGR valve 502, the EGR device is provided with a cooling water passage 502D for cooling with engine cooling water.

Clogging in the EGR pipe 500, or lock of the poppet valve 502C may cause the failure in the EGR device. The EGR failure diagnosis system according to the embodiment of the invention is capable of accurately detecting such failure in the EGR device with the program executed by the engine ECU 1000.

In addition to the EGR device, the above structured engine system includes systems as described below.

The engine system is equipped with a fuel injection control system for controlling the fuel injection quantity based on the intake air flow rate detected by the air flow meter 202 and a vacuum sensor 306. The engine ECU 1000 executes control of the fuel injection quantity and the fuel injection timing corresponding to the engine speed and the engine load such that the burning state becomes optimum based on signals from various sensors.

In the engine system, the fuel injection quantity is determined in accordance with the engine speed and the intake air flow rate (detected by the vacuum sensor 306 and the air flow meter 202). The air/fuel ratio after start-up is feedback controlled based on the signals from $O_2$ sensors 710, 712. Under the fuel injection control, the fuel injection timing control and the fuel injection quantity control are executed to correct the basic ignition time calculated in accordance with the engine operation state with the signals of various sensors.

The engine system includes an ignition timing control system. The engine ECU 1000 calculates an optimum ignition timing based on signals from various sensors so as to output an ignition signal to the ignition coil 808 combined with the igniter. The ignition timing is determined by the initially set ignition timing or the basic advance angle and the corrected advance angle. The engine system includes a knock control system which retards the ignition timing at a predetermined angle until no knocking occurs upon detection of knocking by a knock sensor 704. When the knocking no longer occurs, the angle is increased at a predetermined angle by the knock control system.

The engine ignition timing is calculated by the engine ECU 1000 in accordance with the engine operation state based on signals indicating the engine speed, cam position, intake flow rate, opening degree of the throttle valve, engine cooling water temperature and the like. The resultant ignition signal is output to the ignition coil 808 combined with the igniter. Under the ignition timing control, the basic ignition timing calculated in accordance with the engine operation state is corrected using signals from various sensors so as to obtain an appropriate ignition timing.

The engine system further includes a throttle control system. In the throttle control system, the opening degree of the throttle valve 300 which has been calculated in accordance with the engine operation state is corrected using the signals from various sensors so as to obtain the appropriate opening degree. The engine ECU 1000 executes the control such that the opening degree of the throttle valve 300 becomes an appropriate value in accordance with the engine combustion state using the throttle motor 304.

The engine system further includes an idle rotating speed control system. The idle rotating speed control system controls a first idle rotating speed corresponding to the engine cooling water temperature, and the idle rotating speed after warm-up of the engine. Under the idle rotating speed control, the intake air flow rate is calculated based on signals from the air flow meter 202 and the vacuum sensor 306, and the engine ECU 1000 calculates the optimum opening degree of the throttle valve 300 and the optimum injector opening timing such that the idle rotating speed becomes close to the target value.

The idle rotating speed may be controlled using an idle speed control valve (not shown in FIG. 1) other than the aforementioned idle rotating speed control using the throttle motor. The idle speed control valve adjusts the flow rate of air flowing through the bypass passage of the throttle valve so as to control the idle rotating speed.

The engine system further includes a canister purge control system that introduces the fuel evaporation gas generated in the fuel tank 400 so as to be burned. The canister purge quantity is controlled by the engine ECU 1000 in accordance with the engine operation state for controlling the operation state of a canister purge VSV (Vacuum Switching Valve) 406. At this time, the engine ECU 1000 outputs the duty signal to the canister purge VSV 406 such that its opening degree is controlled.

The engine system further includes an air flow control valve system which executes an optimum control of the air flow within the combustion chamber by closing one of two independent intake ports in accordance with the engine cooling water temperature and the engine operation state so as to stabilize the combustion and to improve the performance. An air flow control valve 600 is provided for one of the independent intake ports, which is operated upon receipt of the signal from the engine ECU 1000. Closing one port may increase the speed at which the intake air flows through the other port, thus intensifying the turbulence in the lateral direction of the combustion chamber. This makes it possible to accelerate spray atomization of the fuel at the low water temperature, resulting in stabilized combustion. Even in the area at low engine speed and high load, the volume efficiency and the combustion efficiency are improved, resulting in higher performance. The engine ECU 1000 determines the opening degree of an air flow control valve 600 based on the engine speed, engine cooling water temperature, load signal and the like. The negative pressure applied to a diaphragm chamber of the actuator via an air flow control valve VSV 602 is changed to operate the air flow control valve 600.

Figure 4:
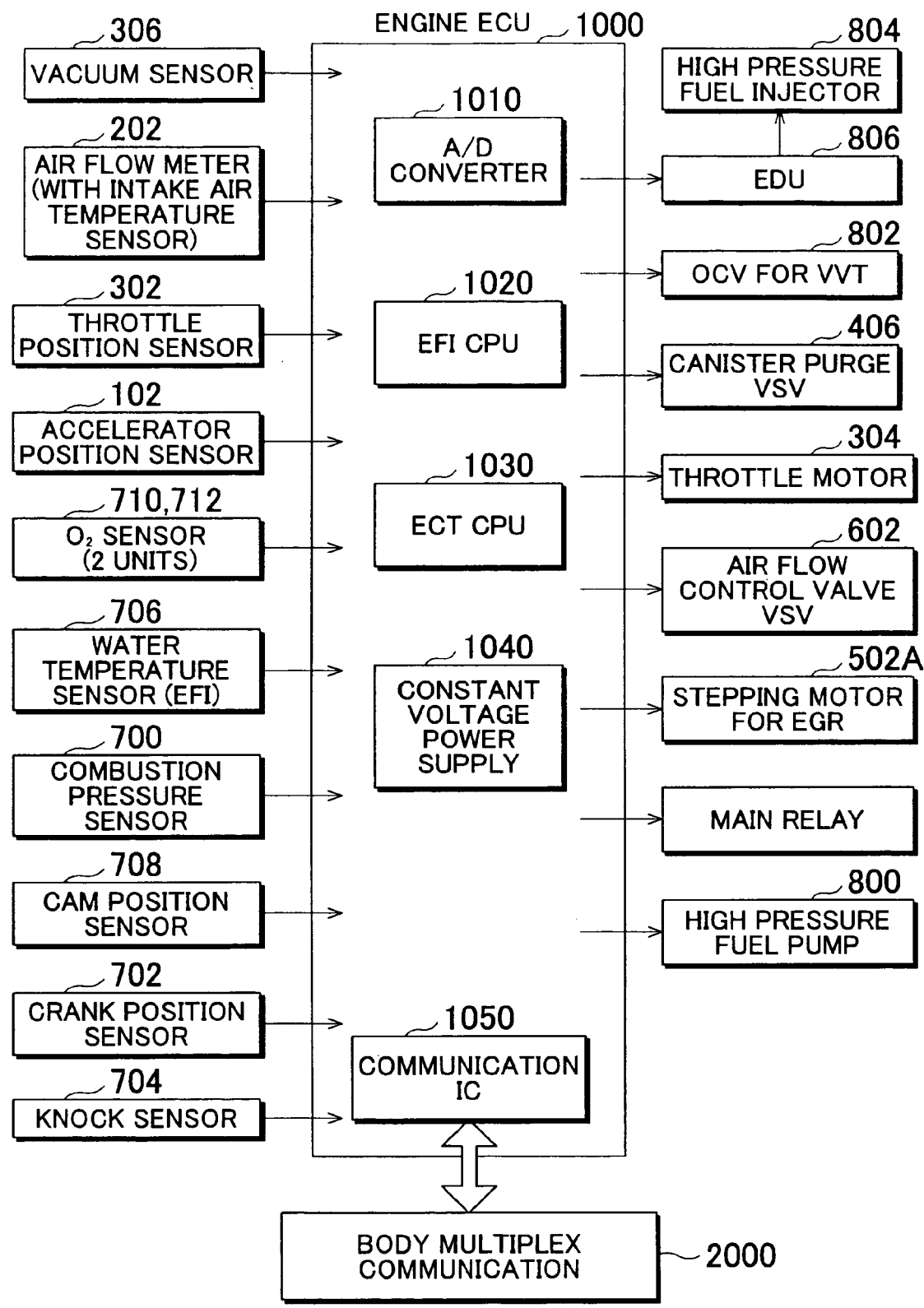
FIG. 4 is a control block diagram of the vehicle to which the EGR failure diagnosis system according to the embodiment of the invention is applied.

FIG. 4 is a control block diagram that includes the engine ECU 1000, various sensors and actuators for controlling the engine system.

The engine ECU 1000 includes an A/D (Analog/Digital) converter 1010 that converts analog signals from various sensors into digital signals, an EFI (Electronic Fuel Injection) CPU (Central Processing Unit) 1020, an ECT (Electronically Controlled Automatic Transmission) CPU 1030, a constant-voltage power supply 1040 that supplies electricity to the aforementioned CPUs, and a communication IC (Integrated Circuit) 1050 that is used for communication with a body multiplex communication 2000.

Sensors for inputting various signals to the engine ECU 1000 will be described hereinafter.

An accelerator position sensor 102 attached to an accelerator pedal detects a depression amount of the accelerator pedal. An accelerator position sensor of linear type may be employed, which is capable of providing a linear output voltage with respect to the depression amount of the accelerator pedal.

An air flow meter of hot wire type provided within an intake air temperature sensor may be employed as the air flow meter 202 for measuring the intake air flow rate. The engine ECU 1000 calculates the flow rate of the intake air supplied to the engine based on the preliminarily stored relationship between the output voltage of the air flow meter 202 and the flow rate.

The throttle position sensor 302 may be attached to a throttle body, for example, so as to detect the opening degree of the throttle valve 300. An electronic position sensor using a hall element makes it possible to realize accurate control as well as lasting reliability.

The vacuum sensor 306 may be a pressure sensor that detects the pressure within the intake pipe. The combustion pressure sensor 700 detects the pressure within the combustion chamber of each of the cylinders upon combustion.

An electromagnetic pick-up type sensor with high detection accuracy may be employed as the crank position sensor 702 for detecting a crank angle. As the crank shaft rotates, the air gap between the protrusion of the crank shaft timing rotor attached to the crank shaft and the crank position sensor is changed. Accordingly the magnetic flux that passes through the coil portion of the crank position sensor varies, resulting in electromotive force generated in the coil portion. The direction of the thus generated voltage measured when the protrusion of the timing rotor approaches the crank position sensor is inverted when the protrusion moves away from the crank position sensor. The alternating voltage as the voltage generated as above serves to detect the crank position and the crank angle speed.

The water temperature sensor 706 detects a temperature of the engine cooling water. The cam position sensor 708 attached to a rear end of the cylinder head detects the protrusion of the cam shaft timing rotor fixed to the intake cam shaft so as to distinguish the cylinder and to detect the actual cam shaft angle. Likewise the crank position sensor 702, the accurate electromagnetic pick-up type sensor may be employed as the cam position sensor 708.

The knock sensor 704 detects knocking of the engine. The $O_2$ sensor 710 detects an oxygen concentration of the exhaust gas at the upstream engine side of the catalytic converter. The $O_2$ sensor 712 detects an oxygen concentration of the exhaust gas at an area between the three-way catalytic converter 900 at the upstream side and a three-way catalytic converter 902 at the downstream side.

The actuator that receives control signals from the engine ECU 1000 will be described.

An EGR stepping motor 502A serves to adjust an opening degree of the EGR valve 502 for the EGR device upon receipt of the control signal from the engine ECU 1000. The air flow control valve VSV 602 serves to operate the air flow control valve 600 in accordance with the operation state of the engine. The negative pressure applied to the diaphragm chamber of the actuator is changed via the air flow control valve VSV 602 based on the control signal output from the engine ECU 1000 for operating the air flow control valve 600.

An opening degree of a canister purge VSV 406 is controlled upon receipt of the control signal from the engine ECU 1000 so as to adjust the canister purge amount.

An OCV (Oil Control Valve) 802 for VVT (Variable Valve Timing) functions in controlling a phase of the intake cam shaft at an optimum valve timing. The hydraulic pressure from the VVT OCV 802 is applied to the advance angle chamber and the retard angle chamber of the VVT controller so as to rotate a vane portion. Accordingly the phase of the intake cam shaft is continuously varied. The VVT OCV 802 is allowed to adjust the oil supply to the advance angle chamber and the retard angle chamber of the VVT controller by controlling the position of the spool valve based on the duty signal from the engine ECU 1000.

A high pressure fuel pump 800 is attached to a cylinder head cover for pressurizing the fuel, and driven by a cam attached to the intake cam shaft. The engine ECU 1000 variably controls the high pressure fuel pump such that the pressure of the high pressure fuel is brought into the value in accordance with the operation state of the engine. In the system, the fuel may be discharged by the required quantity under the control of the electromagnetic valve. This makes it possible to reduce the driving torque as well as the noise.

The high pressure fuel pump 800 is formed of an electromagnetic valve that serves to open or close the intake passage through which the low pressure fuel flows from the fuel tank 400, a pump plunger that is driven by the cam shaft to apply pressure to the fuel, and a check valve that mechanically opens or closes the passage communicated with a fuel delivery pipe. The high pressure fuel pump 800 introduces the fuel by operating the pump plunger up and down such that the fuel is pressurized. The high pressure fuel injector 804 as a high pressure slit nozzle fuel injector includes a slit nozzle by which the highly atomized fuel is injected into the combustion chamber while spreading widely like a fan.

An EDU (Electronic Driver Unit) 806 is employed for operating the high pressure fuel injector 804 accurately at high speeds. The EDU 806 controls the high pressure fuel injector 804 by converting the injection request signal sent from the engine ECU 1000 into the injector signal at high voltage and high current.

The EGR valve 502 of the EGR device is operated with the poppet valve 502C driven by the stepping motor 502A as aforementioned. The EGR valve 502, however, is not limited to the one as aforementioned. It may be of air control type, which includes an air actuator provided with a solenoid valve and a diaphragm rather than the electric actuator such as the stepping motor 502A.

Figure 5:
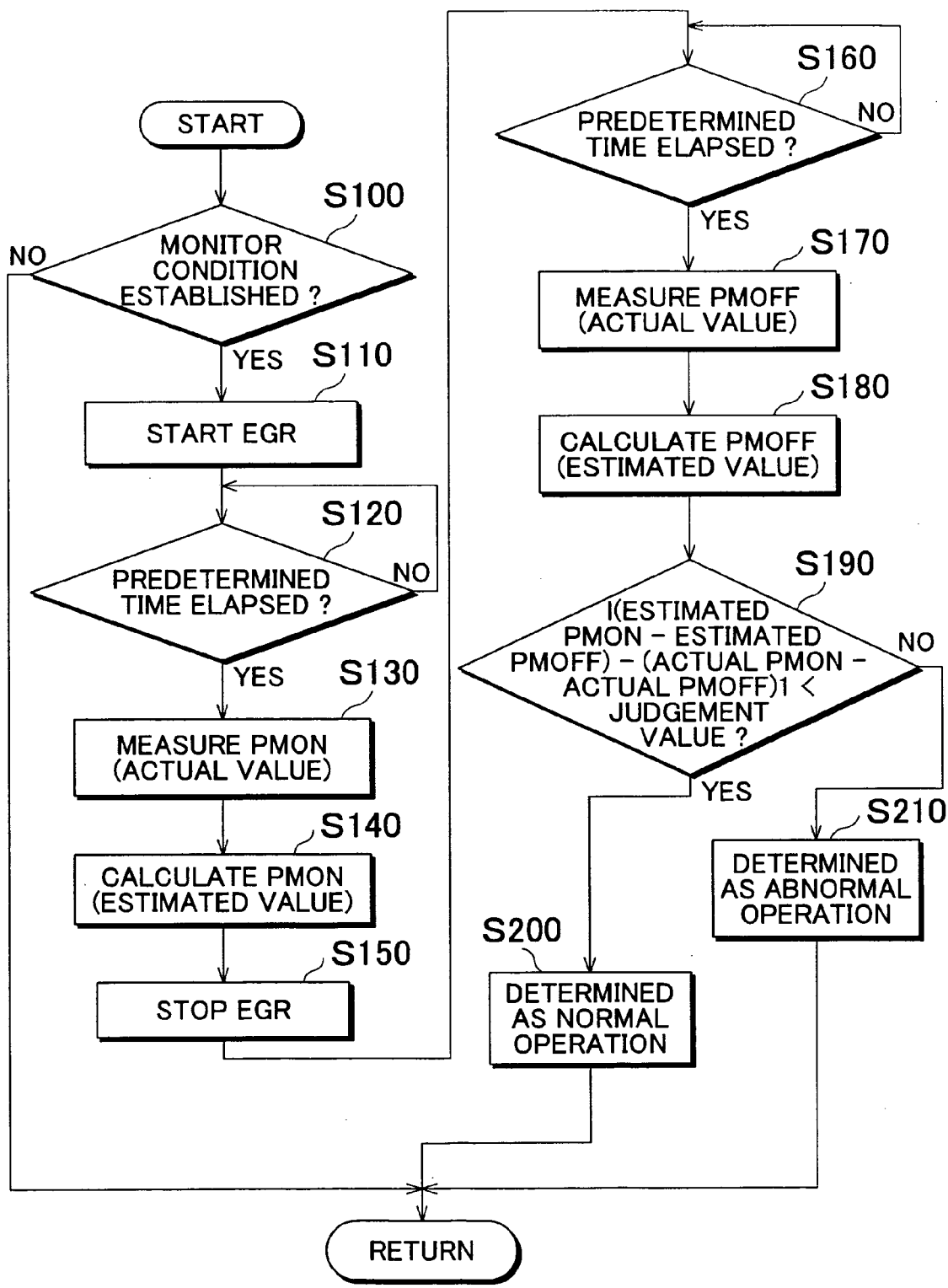
FIG. 5 is a flow chart representing a control routine of a program executed by an engine ECU for realizing the EGR failure diagnosis system according to the embodiment of the invention.

The control routine of the program executed by the engine ECU 1000 that realizes the EGR failure diagnosis system according to the embodiment of the invention will be described referring to the flowchart of FIG. 5.

In step (hereinafter referred to "S") 100, it is determined whether a monitor condition has been established by the engine ECU 1000 based on the vehicle speed, engine speed, intake air flow rate, and throttle opening degree, for example. More specifically, when the vehicle is stopped, it is determined that the monitor condition has not been established. If it is determined that the monitor condition has been established, that is, YES is obtained in S100, the process proceeds to S110. If NO is obtained in S100, the process ends.

In S110, the control signal (valve opening signal) is output to the EGR valve 502 by the engine ECU 1000 so as to start the EGR device.

In S120, it is determined whether a predetermined time has been elapsed from start of the EGR device by the engine ECU 1000. If it is determined that the predetermined time has been elapsed from start of the EGR device, that is, YES is obtained in S120, the process proceeds to S130. If NO is obtained in S120, the process is brought into a standby mode until the predetermined time elapses.

In S130, an actual value of an intake pipe pressure PMON is measured by the engine ECU 1000 based on a signal input from the vacuum sensor 306. Then in S140, an estimated value of the intake pipe pressure PMON is calculated by the engine ECU 1000.

The process in S140 where the estimated value of the intake pipe pressure PMON is calculated will be described. Quantity of air within the intake pipe is calculated for the purpose of obtaining the estimated value of the intake pipe pressure PMON. The quantity of air within the intake pipe may be represented by the following equation:

> air quantity within the intake pipe=air quantity within the intake pipe (calculated result obtained in 1 cycle before)+quantity of air flowing into the intake pipe−quantity of air flowing from the intake pipe=air quantity within the intake pipe (value obtained in 1 cycle before)+quantity of air passing through the throttle valve+EGR flow rate−intake air quantity of engine.

The quantity of air passing through the throttle valve is derived from the atmospheric pressure, the intake pipe pressure, and the opening degree of the throttle valve. The EGR flow rate is derived from the engine speed, a target EGR valve opening degree, and the intake pipe pressure. The intake air quantity of engine is derived from the engine speed and the intake pipe pressure. The estimated value of PMON as the estimated value of the intake pipe pressure is obtained using an equation of state of gas based on the air quantity within the intake pipe calculated by the aforementioned equation, the intake pipe capacity and the intake air temperature. The calculation of the air quantity within the intake pipe is updated at every cycle.

In S150, the control signal (valve closing signal) is output to the EGR valve 502 by the engine ECU 1000 so as to stop or cut the operation of the EGR device.

In S160, it is determined whether a predetermined time has been elapsed from cut of the EGR operation by the engine ECU 1000. If it is determined that the predetermined time has been elapsed from cut of the EGR operation, that is, YES is obtained in S160, the process proceeds to S170. If NO is obtained in S160, the process is brought into the standby mode until the predetermined time elapses.

In S170, an actual value of the intake pipe pressure PMOFF is measured by the engine ECU 1000 based on the signal input from the vacuum sensor 306. Then in S180, an estimated value of the intake pipe pressure PMOFF is calculated by the engine ECU 1000.

In S190, it is determined whether the difference between the value (estimated PMON−estimated PMOFF) and the value (actual PMON−actual PMOFF) is smaller than a judgement value, that is, |(estimated PMON−estimated PMOFF)−(actual PMON−actual PMOFF)|<judgement value. If YES is obtained in S190, the process proceeds to S200. If NO is obtained in S190, the process proceeds to S210.

In S200, it is determined that the EGR device is normally operated by the engine ECU 1000. In this case, if an EGR abnormality alarm lamp or an engine abnormality alarm lamp including the EGR abnormality alarm function is illuminated, such lamp is turned off by the engine ECU 1000. Meanwhile in S210, it is determined that the EGR device is not normally operated owing to abnormality. In this case, the EGR abnormality alarm lamp is illuminated or a failure identification code (diag code) is stored in the memory by the engine ECU 1000.

If the EGR device is determined as being normally operated in the process executed in S190, the change in the actual intake pipe pressure from ON state to OFF state of the EGR device is assumed to become substantially the same as the change in the estimated intake pipe pressure from ON state to OFF state of the EGR device, that is, actual PMON−actual PMOFF≈estimated PMON−estimated PMOFF. Meanwhile, if there is a failure in the EGR device caused by the poppet valve 502C of the EGR valve 502 being locked, for example, the difference in the EGR flow rates between ON state and OFF state of the EGR device is reduced. Accordingly, the difference between the actual PMON and the actual PMOFF becomes smaller than the difference between the estimated PMON and the estimated PMOFF, resulting in the relationship of |(estimated PMON−estimated PMOFF)−(actual PMON−actual PMOFF)|≧judgement value. As a result, NO is obtained in S190.

The equation |(estimated PMON−actual PMON)−(estimated PMOFF−actual PMOFF)| to be compared with the judgement value may be used in place of the equation shown in S190 of the flowchart.

The operation of the engine ECU 1000 as the failure diagnosis system for the EGR device according to the embodiment based on the control program represented by the flowchart will be described hereinafter. In the following explanation, the EGR failure diagnosis system is realized with the program executed by the engine ECU 1000.

Upon establishment of the monitor condition during the vehicle operation, that is, YES is obtained in S100, the EGR device is started in S110 where the EGR valve 502 is brought into the opened state. Upon elapse of a predetermined time from start of the EGR device, that is, YES is obtained in S120, the process proceeds to S130 where an actual value of the intake pipe pressure in ON state of the EGR device, that is, the actual PMON is measured.

The air quantity within the intake pipe is derived from the atmospheric pressure, the opening degree of the throttle valve, the engine speed, the target EGR valve opening degree and the like at that moment. Then the estimated value of the intake pipe pressure in ON state of the EGR device, that is, estimated PMON is calculated using the state of equation of gas in S140.

The process proceeds to S150 where the EGR operation is cut by bringing the EGR valve 520 into the closed state from the opened state. When a predetermined time has elapsed from cut of the EGR operation, that is, YES is obtained in S160, the process proceeds to S170. In S170, the actual value of the intake pipe pressure in OFF state of the EGR device is measured based on the signal input from the vacuum sensor 306.

Then in S180, the estimated value of the intake pipe pressure PMOFF is calculated.

The comparison of the value as the difference between the change in the estimated values, that is, estimated PMON−estimated PMOFF and the change in 30 the actual values, that is, actual PMON−actual PMOFF is made with respect to the predetermined judgement value, that is, |(estimated PMON−estimated PMOFF)−(actual PMON−actual PMOFF)|<judgement value in S190. If the value of the difference is smaller than the judgement value, that is, YES is obtained in S190, it is determined that the EGR device is normally operated with no failure in S200. Meanwhile, if the value of the difference is equal to or larger than the judgement value, it is determined that the EGR device is not normally operated owing to abnormality in S210.

The relationship of the operation state of the EGR valve 502 and the state of the intake pipe pressure with respect to time will be described referring to the graph shown in FIG. 6.

Figure 6:
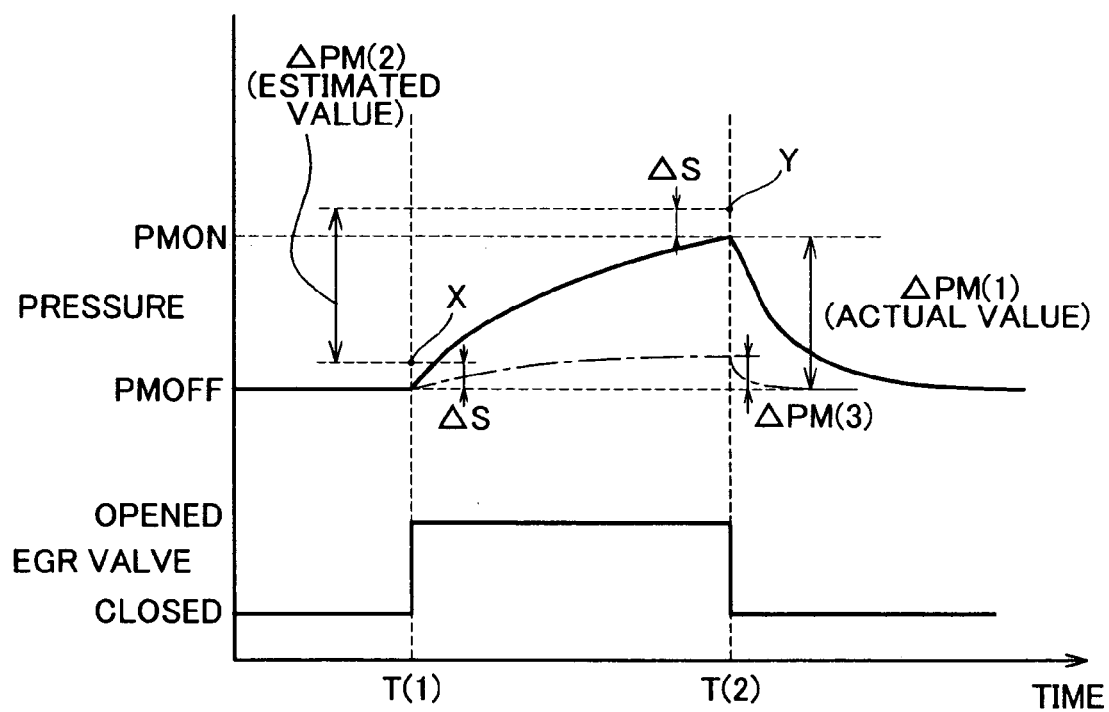
FIG. 6 is a graph representing the change in the pressure with respect to time, which is caused by the EGR device to be diagnosed by the failure diagnosis system for the EGR device according to the embodiment of the invention.

As shown in FIG. 6, the EGR valve 502 is brought into the opened state from the closed state at time T(1). The EGR valve 502 is then brought into the closed state from the opened state at time T(2). If the EGR device is normally operated at time T(1), the intake pipe pressure value gradually increases from the PMOFF to reach the value PMON at T(2). As time passes over T(2), the EGR valve 502 is brought into the closed state from the opened state, and the intake pipe pressure value decreases from the PMON to PMOFF as shown by a solid line. The resultant difference in the actual value is represented by ΔPM (1).

It is assumed that the value detected by the vacuum sensor 306 for detecting the actual value includes an error. Supposing that the vacuum sensor 306 detects the value that deviates from the actual value, the actual values PMOFF and PMON deviate from the respective actual values in the same way. In FIG. 6, the vacuum sensor 306 outputs values that are smaller than the actual values X, Y (represented as estimated values), respectively. The estimated value at time T(1) is measured as the value (X) that is larger than the actual value, and the estimated value at time T(2) is measured as the value (Y) that is larger than the actual value.

The degree of deviation of the detected value from the actual value is substantially the same both at T(1) and T(2). Such deviation, thus, may be offset by calculating the difference between the actual values PMON and PMOFF, that is, actual PMON−actual PMOFF. As the error in the value detected by the vacuum sensor 306 is offset by obtaining the ΔPM (1) (actual value), such error gives no influence on the failure diagnosis with respect to the EGR device using the difference between the actual ΔPM(1) and the estimated ΔPM(2).

Meanwhile, if the EGR device has a failure caused by the poppet valve 502C of the EGR valve 502 being locked, the pressure never increase or increases only at the degree of ΔPM(3) even if the EGR valve 502 is brought into the opened state from the closed state at time T(1) as shown by the chain line of FIG. 6. This is because the exhaust gas cannot be sufficiently recirculated into the intake pipe owing to the lock state of the EGR valve 502, and accordingly the intake pipe pressure does not increase. The difference in the estimated value ΔPM(2) is considerably larger than the difference in the actual value ΔPM (3). It is then determined that there is the failure in the EGR device.

In the EGR failure diagnosis system according to the embodiment realized through execution of the program by the engine ECU, the intake pipe pressures are detected by the vacuum sensor both in ON state and OFF state of the EGR device. The estimated values of the intake pipe pressures both in ON state and OFF state of the EGR device are calculated using the physical model. The difference between the change in the estimated intake pipe pressures both in ON state and OFF state and the change in the actual intake pipe pressures both in ON state and OFF state is calculated. If the resultant difference value is smaller than a predetermined judgement value, it is determined that the EGR device is normally operated. If the resultant difference value is equal to or larger than the judgement value, it is determined that the EGR device has the failure.

In the state where the failure occurs in the EGR device, the exhaust gas cannot be sufficiently recirculated into the intake pipe. The actual value of the intake pipe pressure does not increase contrary to the estimated value indicating the increasing intake pipe pressure. This is because the estimated value of the intake pipe pressure is calculated in the formula using the physical model on the assumption that the EGR device has no failure. The error in the value detected by the vacuum sensor may be offset by calculating the difference between the actual value of the pressure in ON state of the EGR device and the actual value of the pressure in OFF state of the EGR device. Accordingly the failure in the EGR device may be diagnosed accurately.

While a preferred embodiment of the invention has been described using specific terms, such description is for illustrative purposes only, and it is to be understood that changes and variations may be made without departing from the spirit or scope of the following claims.

What is claimed is:

1. A failure diagnosis system for an exhaust gas recirculation device provided in an internal combustion engine for recirculating a part of an exhaust gas into an intake pipe of the internal combustion engine via a recirculation valve, comprising:

a detection unit that detects on state and off state actual pressures within the intake pipe, the on state and the off state actual pressures respectively being detected when the exhaust gas is recirculated and is not recirculated;

a calculation unit that calculates on state and off state estimated intake pipe pressures, the on state and the off state estimated intake pipe pressures respectively being estimated pressures within the intake pipe upon detection of the on state and off state actual pressures; and a diagnosis unit that diagnoses a failure in the exhaust gas recirculation device by comparing a difference between the on state estimated intake pipe pressure and the off state estimated intake pipe pressure with a difference between the on state actual pressure and the off state actual pressure.

2. The failure diagnosis system according to claim 1, wherein the calculation unit calculates the on state and the off state estimated intake pipe pressures based on at least one of a rotating speed of the internal combustion engine, an opening degree of a throttle valve, and a flow rate of intake air.

3. A failure diagnosis system for an exhaust gas recirculation device provided in an internal combustion engine for recirculating a part of an exhaust gas into an intake pipe of the internal combustion engine via a recirculation valve, comprising:

a detection unit that detects on state and off state actual pressures within the intake pipe, the on state and the off state actual pressures respectively being detected when the exhaust gas is recirculated and is not recirculated;

a calculation unit that calculates on state and off state estimated intake pipe pressures within the intake pipe, the on state and the off state estimated intake pipe pressures respectively being estimated pressures within the intake pipe upon detection of the on state and the off state actual pressures; and a diagnosis unit that diagnoses a failure in the exhaust gas recirculation device by comparing a difference between the on state estimated intake pipe pressure and the on state actual pressure with a difference between the off state estimated intake pipe pressure and the off state actual pressure.

4. The failure diagnosis system according to claim 3, wherein the calculation unit calculates the on state and the off state estimated intake pipe pressures based on at least one of a rotating speed of the internal combustion engine, an opening degree of a throttle valve, and a flow rate of intake air.

* * * * *

UNITED STATES PATENT AND TRADEMARK OFFICE
CERTIFICATE OF CORRECTION

| | |
|---|---|
| PATENT NO. | : 7,100,586 B2 |
| APPLICATION NO. | : 11/075894 |
| DATED | : September 5, 2006 |
| INVENTOR(S) | : Takuya Matsumoto |

Page 1 of 1

It is certified that error appears in the above-identified patent and that said Letters Patent is hereby corrected as shown below:

| Column | Line | |
|---|---|---|
| 12 | 49 | After "change in" delete "30". |

Signed and Sealed this

Twenty-fourth Day of July, 2007

JON W. DUDAS
*Director of the United States Patent and Trademark Office*